United States Patent
Sharma et al.

(10) Patent No.: US 7,136,382 B1
(45) Date of Patent: Nov. 14, 2006

(54) SYSTEM AND METHOD FOR PROVIDING QUALITY OF SERVICE OPERATIONS USING IP ADDRESSES

(75) Inventors: Monty Sharma, Westborough, MA (US); Alan S. Murray, Boston, MA (US); Stephen A. Bromwich, Halifax (CA)

(73) Assignee: Novell, Inc., Provo, UT (US)

( * ) Notice: Subject to any disclaimer, the term of this patent is extended or adjusted under 35 U.S.C. 154(b) by 798 days.

(21) Appl. No.: 09/939,447

(22) Filed: Aug. 24, 2001

Related U.S. Application Data

(60) Provisional application No. 60/227,882, filed on Aug. 25, 2000.

(51) Int. Cl.
H04L 12/56 (2006.01)

(52) U.S. Cl. .................. 370/392; 370/235; 370/475

(58) Field of Classification Search ............... 370/235, 370/392, 401, 475, 528, 529
See application file for complete search history.

(56) References Cited

U.S. PATENT DOCUMENTS

| 6,101,193 | A | * | 8/2000 | Ohba | 370/429 |
| 6,438,122 | B1 | * | 8/2002 | Monrad et al. | 370/349 |
| H02051 | H | * | 11/2002 | Zhu et al. | 370/395.21 |
| 6,483,805 | B1 | * | 11/2002 | Davies et al. | 370/235 |
| 6,643,260 | B1 | * | 11/2003 | Kloth et al. | 370/235 |
| 6,654,610 | B1 | * | 11/2003 | Chen et al. | 455/450 |
| 6,658,006 | B1 | * | 12/2003 | Chen et al. | 370/395.1 |
| 6,728,208 | B1 | * | 4/2004 | Puuskari | 370/230.1 |
| 6,917,617 | B1 | * | 7/2005 | Jin et al. | 370/395.21 |
| 2002/0012356 | A1 | * | 1/2002 | Li et al. | 370/423 |

OTHER PUBLICATIONS

Douglas E. Comer, Internetworking With TCP/IP vol. 1, Principles, Protocols, And Architecture, 1995, Prentice-Hall Inc., vol. 1, p. 60-61.*
Naugle, Network Protocols-Signature Edition, 1999, pp. 657-664, McGraw-Hill, New York.
David McDysan, Qos & Traffic Management in IP & ATM Networks, 2000, pp. 24-26, 87-95, and 444-447.

* cited by examiner

Primary Examiner—Ricky Q. Ngo
Assistant Examiner—Nguyen H. Ngo
(74) Attorney, Agent, or Firm—Schwegman, Lundberg, Woessner & Kluth, P.A.

(57) ABSTRACT

A method and apparatus are disclosed for using unused address bits of an IPv6 address to carry quality of service (QoS) request information over a computer network, such as the Internet, so that at intermediate nodes along the network the routers and switches thereat may easily determine the QoS being requested for packets and forward the packets with the requested QoS.

19 Claims, 5 Drawing Sheets

QoS LOOKUP TABLE

| | | |
|---|---|---|
| 0001 | QoS LEVEL 1 | (INTERNET TELEPHONY) |
| 0010 | QoS LEVEL 2 | (VIDEO CONFERENCING) |
| 0011 | QoS LEVEL 3 | |
| 0100 | QoS LEVEL 4 | |
| 0101 | QoS LEVEL 5 | |
| 0110 | QoS LEVEL 6 | |
| 0111 | QoS LEVEL 7 | —500 |
| 1000 | QoS LEVEL 8 | |
| 1001 | QoS LEVEL 9 | |
| 1010 | QoS LEVEL 10 | |
| 1011 | QoS LEVEL 11 | |
| 1100 | QoS LEVEL 12 | |
| 1101 | QoS LEVEL 13 | |
| 1110 | QoS LEVEL 14 | (LOWEST LEVEL) |

*FIG. 5*

SYSTEM AND METHOD FOR PROVIDING QUALITY OF SERVICE OPERATIONS USING IP ADDRESSES

RELATED INVENTION

This application is related to and claims the benefit of U.S. Provisional Patent Application Ser. No. 60/227,882, entitled "Novell Service Provider Network (NPSN) Architecture," and filed Aug. 25, 2000.

BACKGROUND OF THE INVENTION

A communications network, such as the Internet, transmits packets of information between interconnected communications sites. Information of all types, such as text, pictures, music and video, is transmitted over the network in the form of information packets using a protocol such as the Internet Protocol (IP). Each packet can travel though a number of communications sites, over a "path" or "route," before reaching the destination site. Some communications sites are called "routers" because they direct a packet to the next leg, or "hop," of the route towards the destination site. When all of the packets have arrived at the destination, they are reassembled to re-create the information that was originally transmitted. IP is called a "connection-less" system because each individual packet of information can take a different path to reach the destination site.

A communication that relies solely on IP can be unreliable due to packet loss, reordering and duplication. The IP delivery model is often referred to as a "best effort" system and an additional end-to-end protocol, such as Transmission Control Protocol (TCP), is required to provide reliability. TCP achieves this through mechanisms such as acknowledgements and packet re-transmission, which adds to the overall information transfer delay.

The best effort IP communications model is adequate for some network applications, such as File Transfer Protocol (FTP) and e-mail. For other network applications, however, such as those sending multimedia information that requires a high bandwidth, the delay and other problems caused by the best effort IP model can be unsatisfactory. For these other applications, a method of ensuring a certain Quality of Service (QoS), including bandwidth, delay, and packet loss guarantees, is required.

Video on the Internet

In recent years, the technologies of video data compression, storage, and interactive accessing have converged with network communications technologies, to present exciting prospects for users who seek access to remotely stored multimedia information.

Voice over IP

Traditionally, computer networks were used to exchange static files or data, such as text and spreadsheet files, while the Public Switched Telephone Network (PSTN) was used to exchange voice information. Computer networks, however, are increasingly being used to transport "voice" information. Such networks include a plurality of voice agents that convert voice information from its traditional telephony form to a form that is suitable for packet transmission. In other words, the voice agent encodes, compresses and encapsulates the voice information into a plurality of data packets. Examples of voice agents include IP telephones, voice over IP (VoIP) gateways, certain private branch exchanges (PBXs), personal computers (PCs) running communication applications, network devices providing voice gateway services, etc. A calling party uses a voice agent to initiate a VoIP call. Once the voice information has been converted into digitized packet format, it is carried by the computer network to a second voice agent configured to serve the called party. Voice traffic, unlike static data files or records, is highly sensitive to delay and to lost packets. That is, delays in receiving data packets carrying voice information at the called party's voice agent can seriously degrade the quality of the call. Accordingly, packets carrying voice information should be delivered to the called party with the highest QoS and in a timely manner.

The IPv6 Protocol

To facilitate cooperation among networks and computers, procedures and standards for protocols used for communication over the Internet are provided in, e.g., standards that are agreed upon and used by Internet users and organizations. For example, the World Wide Web Consortium develops standards for the evolution of a fast growing part of the Internet, the World Wide Web (the "Web"). In addition, the Internet society supports the work of the Internet Activities Board (IAB), which handles much of the Internet's architectural issues. The IAB's Internet engineering task force is responsible for overseeing the evolution of protocols, such as the Transmission Control protocol/Internet protocol (TCP/IP) and version 6 of the IP protocol (IPv6).

With the existing IPv4 protocol, each IP address consists of 32 address bits divided into four groups of eight bits (A.B.C.D), each group separated by a period. An IP address consists of a first part called the "network number", and a second part called the host ID that identifies an individual host on that network.

Networks consist of individual segments of network cable or links interconnected by gateway devices like routers and bridges. Each host on the Internet, or any other IP network, is uniquely identified on the network by a "network number". Such network numbers permit a group of host computers (peers) to communicate efficiently with each other. Network numbers look very much like IP addresses, but the two should not be confused.

In addition, IP addresses are divided into five groups designated classes A–E. Addresses in classes A and B have already been assigned to large organizations, and addresses in classes D and E have been reserved for special purposes by the IP administrative authorities. One of these special purposes is multicast operation. This leaves only the class C range of addresses available for public use.

In general, a network address uses the leftmost byte (8 bits) of its host's addressing if the address falls within the class A range, uses the leftmost two bytes of its host's addressing if the address falls within the class B range, and uses the leftmost three bytes of its host's addressing if the address falls within the class C range. Network addressing fundamentally organizes hosts into groups. This can improve security by isolating critical nodes, and can reduce network traffic by preventing transmissions between nodes that do not need to communicate with each other.

Network addressing becomes even more powerful when used to introduce sub-netting. Subnets allow network traffic between hosts to be segregated based on the network's configuration. This improves network security and performance to a degree by organizing hosts into small groups.

Due to the explosion of Internet use, the number of addresses currently available in class C is limited. For this and other reasons the IAB's Internet engineering task force developed the IPv6 protocol based on a 128 bit IP address.

Version 6 of the IP protocol makes a number of changes to the existing IPv4 protocol to improve Internet operations. Part of these changes affect IP addressing. The number of address bits is increased from 32 to 128 to expand the number of IP addresses that can be generated to more than $3 \times 10^{38}$ addresses. However, the increase in the number of IP address bits results in long IP addresses. To alleviate this result, IPv6 addresses are specified with hex numbers rather than decimal numbers, and an addressing shorthand is utilized. Other changes introduced in the IPv6 protocol add additional features for performance and privacy.

The Internet generally operates according to a client/server model of information delivery. The primary reason to configure a client/server network is to allow many clients to access similar applications in files stored on a server. In this model, a client computer "connects" to a server computer on which information resides, to thereby request the services of the server. The services provided by the server may involve searching for information and returning it to the client, such as when a database on the Web is queried. Other examples of services include delivering information (such as a "web page") and handling incoming and outgoing electronic mail (e-mail).

To access a web site on the Internet to request a service, a client typically generates and issues packets to an online service or an Internet service provider (ISP). The client issues the packets by either dialing into the online service or ISP over a telephone line, or through an Internet service, such as a cable modem or high-speed digital subscriber line (DSL) connection. Telephone lines may transmit data at, e.g., 56 kilobits per second (Kbps), whereas leased telephone lines, such as T1 lines, may be employed to carry data at higher rates, such as 1.544 Mbps. Higher-speed links, such as T3 links, can transport data at rates up to 44.746 Mbps. From the ISP, the packets travel through levels of communication links, hardware platforms, and networks before they reach their final destination. The hardware platforms may comprise intermediate stations, such as hubs, routers and switches, configured to process the packets and forward them over the networks to their proper destinations. Specifically, the intermediate stations direct data traffic over the Internet by processing the packets traveling over the network to determine where the data is headed. Based on the destination of the data, the packet is routed in a most efficient manner, generally to another intermediate station that, in turn, sends the packet to a next station.

However, routing of packets in this manner may not provide the quality of network links necessary for a particular transmission of packets. For example, a series of packets may carry a voice signal and require network links having a high Quality of Service (QoS) to provide the bandwidth required for the voice data packets. Presently, some of the voice data packets may be routed over high quality network links but other packets may not. A voice signal reconstructed from voice data packets not traveling over high-quality network links with appropriate bandpass will often exhibit noticeable degradation to a listener. A user requiring a link with a high QoS to handle signals such as voice data packets often has to lease a dedicated high QoS line between a source and destination to ensure the level of service needed to carry such packets.

To meet this need, a dedicated-connection switching technology, called Asynchronous Transfer Mode (ATM), has been developed. ATM is a "connection" oriented system because a specific path, called a Switched Virtual Circuit (SVC), is established between an origin and a destination. Every information packet flowing from the origin to the destination travels over the same SVC. Such an arrangement allows the system to establish a specific QoS for a specific flow. This can be done, for example, by reserving resources, such as bandwidth, along the path of the SVC when the SVC is created.

Because of the differences between IP and ATM, various protocols have been developed to transmit IP traffic over an ATM network infrastructure. One such protocol is the Resource Reservation Setup Protocol (RSVP).

RSVP

RSVP is a signaling protocol that also permits entities to reserve bandwidth on computer networks to receive from one or more sourcing entities a desired traffic flow, such as a multimedia signal stream. In RSVP, a data flow is a sequence of messages that have the same source, destination (one or more), and the same desired quality of service.

Pursuant to RSVP, sources send RSVP Path messages identifying themselves and indicating the bandwidth needed to receive their programming or content. These messages proceed hop-by-hop through intermediate network devices (such as routers), making those devices aware of the possibility that a reservation of resources may be required. If a receiver is interested in the programming or content offered by a particular source, it responds with a reservation request contained in a RSVP Reservation (Resv) message. This message travels hop-by-hop back to the source. At each hop, the corresponding intermediate device establishes a session for the receiver and sets aside sufficient resources to provide the requested bandwidth for the desired traffic flow. These resources are immediately made available to the packetized traffic flow. If the resources are not available, the reservation is refused explicitly so that the receiver knows it cannot depend on the corresponding resources being devoted to its traffic. By using RSVP, packets carrying voice information and other high QoS services can be accorded the resources and services they need to ensure timely delivery.

However, RSVP requires that to make such QoS reservations routers along the Internet backbone must be RSVP enabled and communications must first take place through such RSVP enabled routers to reserve a path or "tunnel" through the Internet having the required QoS from end to end. This is followed by transmission of the packets over the reserved path. Thus, the RSVP operation requires additional time caused by making path reservations before packets can be transmitted. This is a detriment.

SUMMARY OF THE INVENTION

The need in the networking art for a way to rapidly route packets having a particular QoS requirement through network nodes is met by the present invention. A small portion of a 128 bit IPv6 address that is not assigned for addressing is utilized, and a code is placed therein that indicates the quality of service (QoS) that the data packet, to which the address is appended, should receive. Stated another way, unused IPv6 address bits are used for the non-addressing purpose of specifying QoS for data packets. By placing such QoS requests in the body of the IPv6 address the need to receive additional space in a packet header for such QoS requests is eliminated. This is helpful because there is little space available in packet headers. In addition, extra processing time is not required to make QoS reservations and create a "tunnel" through the Internet before packets can be transmitted as is required with RSVP.

The effect of using a portion of an IPv6 address to indicate a QoS to be assigned to a type of data traffic on the Internet is to create Internet protocol (IP) zones. Assume a conventional IPv4 address may be represented as Y.Z, where each letter represents 16 addressing bits. In contrast, an IPv6 address may be represented as A.B.C.D.E.F.Y.Z, wherein each letter also represents 16 addressing bits. The sixteen bit portion of the IPv6 address represented by the letter "D" is presently unassigned for use in addressing and, according to the teaching of the present invention, may be used to implement the novel QoS technique.

Specifically, the first 4 bits of the 16-bit "D" portion of the address may be utilized to illustrate the invention. The first 4 bits of the "D" portion of the address are used to define 14 different combinations ranging from "0001" to "1110", with "0000" and "1111" being presently unused. In the illustrative embodiment described herein, these combinations may be used to define zones or classes of service that define specific levels of QoS for transmission of data packets over the Internet.

An exemplary preferred zone or class of service would be the provision of Internet Telephony services, also called voice over IP (VoIP), which requires high bandwidth. Other examples would be a video teleconferencing zone or class of service and an entertainment zone or class of service. The only distinguishing factor between these different classes of service is that they each require a different QoS for the transmission of packets over a network, such as the Internet.

The present invention thus operates to select or allocate specific resources or a series of intermediate devices to thereby provide and deliver the QoS specified by the unused portion of the IPv6 address space.

DESCRIPTION OF THE DRAWINGS

The invention will be better understood by referring to the following detailed description in conjunction with the accompanying drawings in which like reference numerals indicate identical or functionally similar elements.

FIG. 5 shows a lookup table used by a router to determine the level of QoS service to be provided to information packets passing through the router.

DETAILED DESCIPTION

Figures 1, 2:
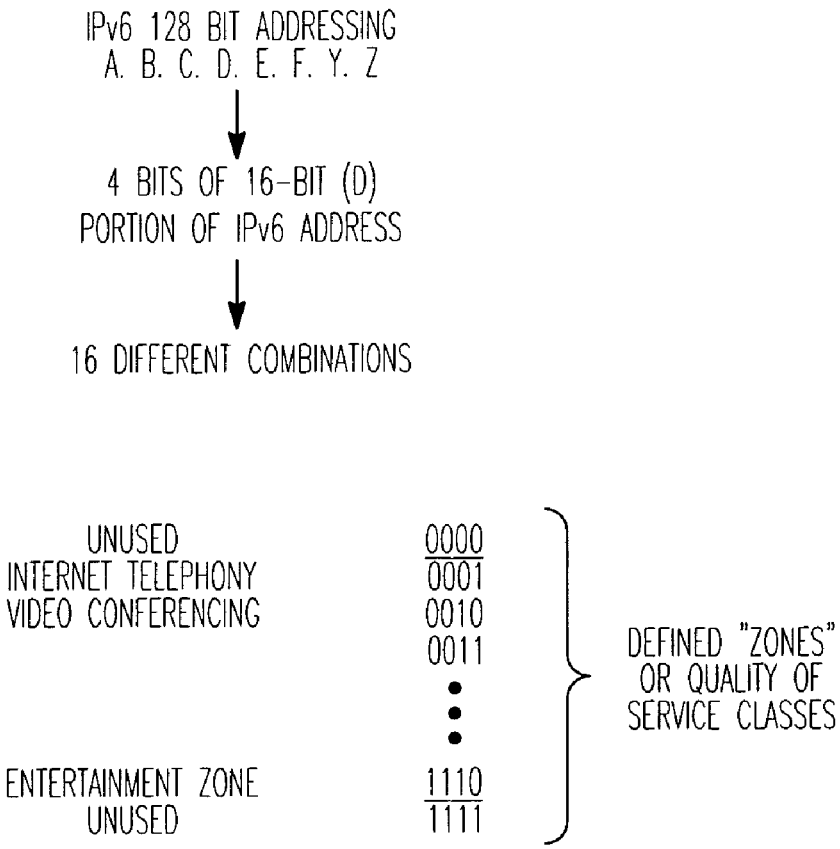
FIG. 1 is a chart illustrating the novel IP QoS technique in accordance with the teaching of the present invention.
FIG. 2 shows how use of the invention provides non-address use of the IPv6 address to provide QoS indications.

FIG. 1 is a chart illustrating the novel QoS technique utilizing IPv6 addresses. IPv6 addressing involves the use of 128-bit addresses, as opposed to 32-bit addressing for conventional IPv4 addressing. According to the invention, IP zoning contemplates the creation of zones throughout the Internet utilizing IPv6 addressing. Assume a conventional IP address may be represented as Y.Z, wherein each letter represents 16 bits of addressing information. In contrast, an IPv6 address may be represented as A.B.C.D.E.F.Y.Z, wherein each letter represents 16 bits of addressing information. It should be noted that the "Y.Z" portions of the IPv6 address carry conventional IPv4 addressing that will route packets to an IP address designated therein.

According to one embodiment of the present invention, the portion of the IPv6 address represented by the letter "D" is used to implement the novel IP zoning technique. Specifically, the first 4 bits of the 16-bit "D" address portion are utilized. The addressed portion represented by the letter "D" is characterized as a third level associate (TLA) block of addresses within the IPv6 address space that may be used by a private entity. Notably, 4-bits of binary information may define 16 different combinations ranging from "0000" to "1111". In the illustrative embodiment, the combinations "0000" and "1111" are not used, with the remaining fourteen combinations being used to define zones or classes of service within the Internet. It should be noted, however, that these unused combinations along with a different number of bits may be utilized to define IP zones or classes, and these bits may be located within other unused portions of the IPv6 address.

For example, the binary bit combination "0001" may be defined as a first business zone for Internet telephony (Voice over IP—VoIP) that guarantees constant, high-grade QoS for voice over IP transactions between end users. Similarly, the combination "0010" may be defined as a second business zone for video conferencing. The combination "1110" may be defined as a third business zone for entertainment that is used to provide multimedia such as movies and music to consumers. Others of the possible combinations may be utilized to define other Internet business zones for applications requiring a unique QoS that is different from those described above.

FIG. 2 shows how use of the described embodiment provides non-address use of the IPv6 address to provide QoS indications. The 16-bit portions of an IPv6 address designated A.B.C.D.E.F.Y.Z are shown with the "D" portion being replaced by 16 zeros and ones. Since the "D" portion is unassigned for addressing purposes the bits are all zero except for the first four bits which are utilized to implement the present invention. These first four bits are configured as a QoS code "1110" which from FIG. 1 is assigned to the entertainment zone or class of service. Alternatively, the first four bits may be configured as "0001", to thereby indicate a quality of service used for, e.g., Internet telephony but which may also be used by other applications requiring the same high QoS for packet transmission over a computer network.

Figure 3:
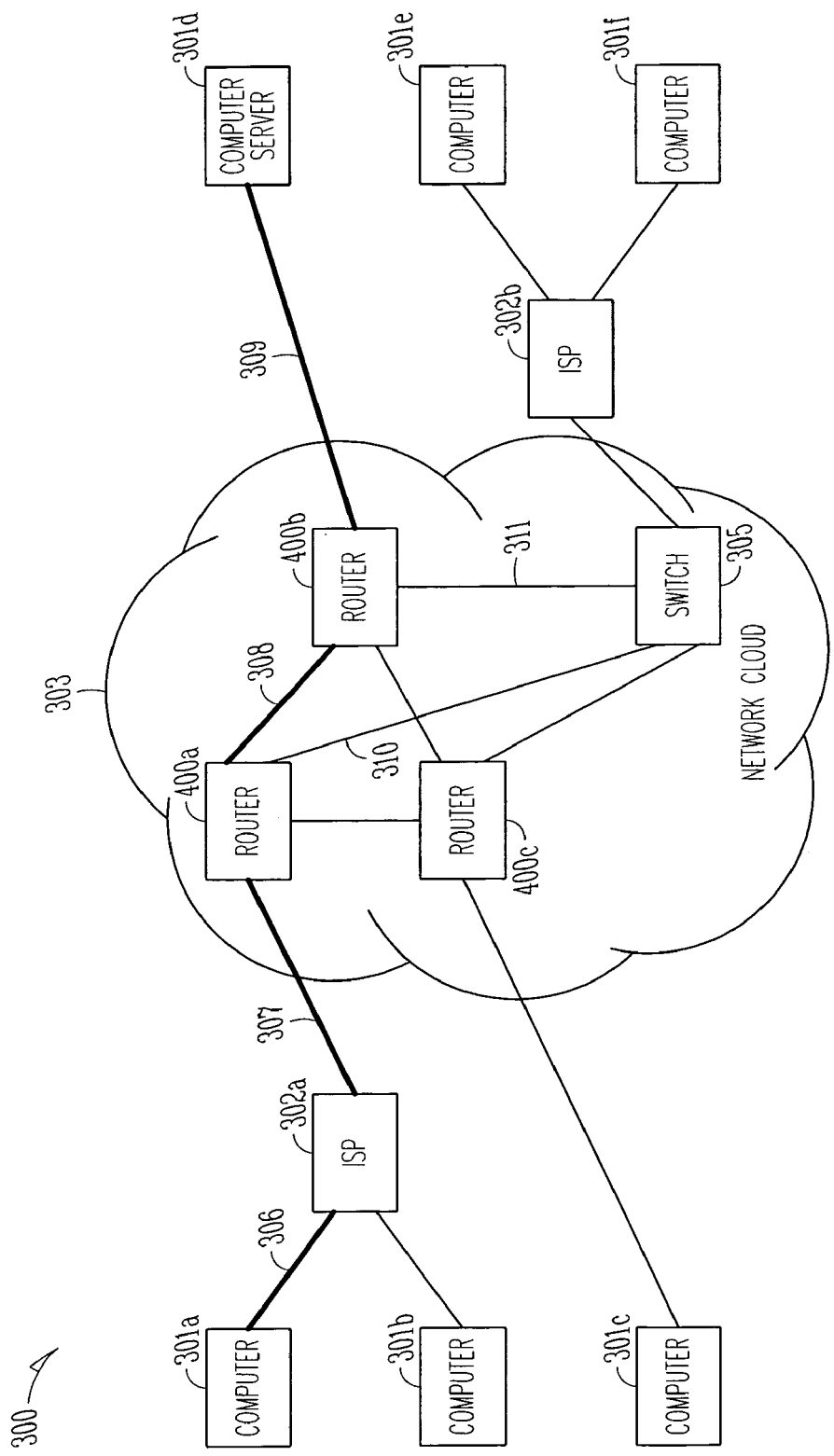
FIG. 3 shows a block diagram of a networked computer system, such as the Internet.

FIG. 3 is a block diagram of a computer network 300, such as the Internet. The network 300 includes computers 301a–301f and Internet Service Providers (ISP) 302 a–b, that are interconnected through network cloud 303. The network cloud 303 preferably comprises a plurality of intermediate network devices represented by routers 400 a–c and switches 305, but may also comprise hubs and other network devices. Computers 301 typically are personal computers or workstations connected to the Internet via an Internet Service Provider (ISP) or may be servers, workstations or larger computer systems connected directly to the Internet. For example, computer 301a is coupled via ISP 302a to network cloud 303 and to another of a plurality of computers, such as computer 301d.

As one example, computer 301a may be connected via a computer at ISP 302a, and path 307 to router 400a then, in turn, via path 308 and router 400b and path 309 to computer 301d. Alternatively, the connection between computers 301a and 301d may be connected through network cloud 303 via router 400a, path 310, switch 305, path 311, and router 400b, to path 309 and computer 301d. The thick lines indicate the data flow path between computer 301a and server 301d. It is apparent that there are a very large number of possible paths through network cloud 303 over which connections may be established between ones of computers 301a–f.

It should be understood that the network configuration 300 of FIG. 3 is shown for illustrative purposes only and that the present invention will operate with other, far more complex, network topologies.

Figure 4:
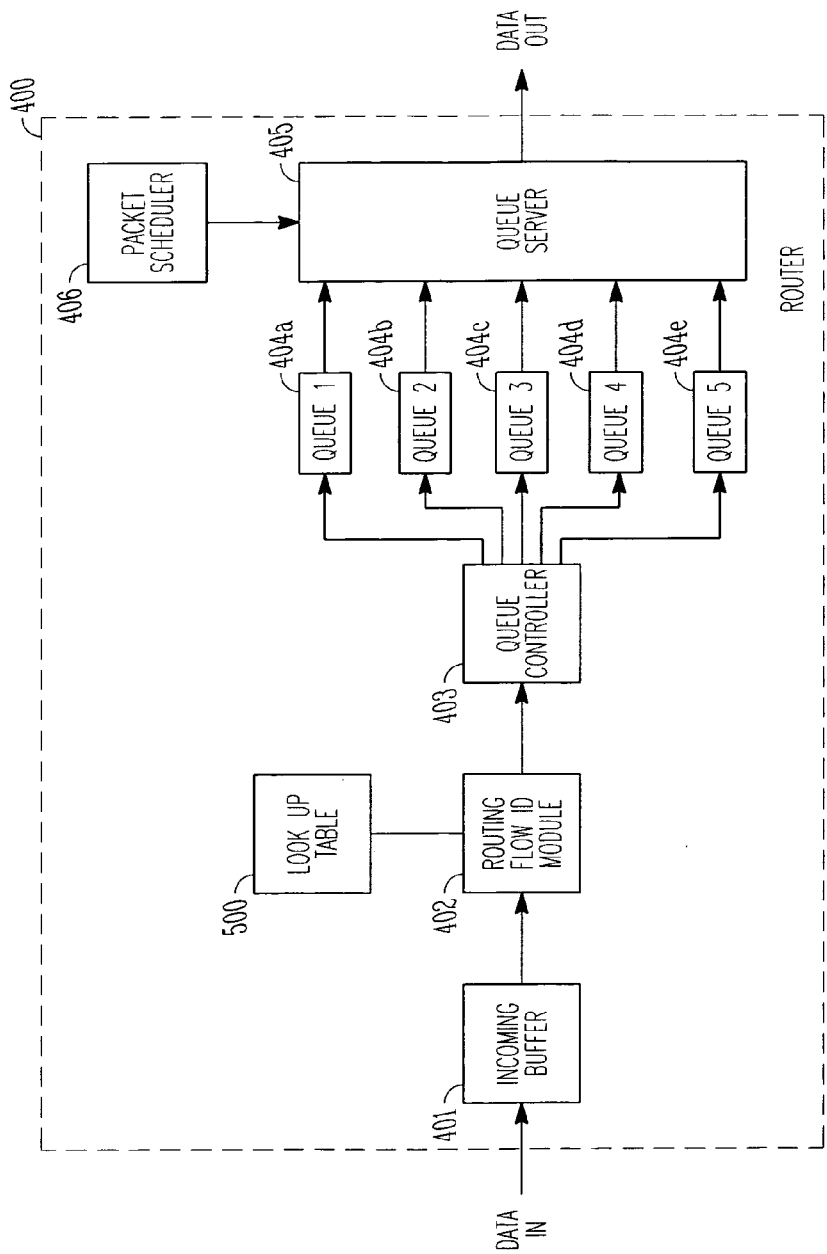
FIG. 4 shows a simplified block diagram of a router.

FIG. 4 shows a simplified block diagram of a router 400 such as that typically found at intermediate nodes between path segments or links in network cloud 303. Router 400 contains an incoming buffer 401. Buffer 401 receives each data packet at Data In. Routing flow identification module 402 receives a data packet from buffer 401 and reads information from its header to determine the data flow and to read the QoS information in the first four bits of the "D" portion of the IPv6 address. Responsive to the 4-bit code, module 402 looks up the code in a QoS lookup table 500, the contents of which are shown in FIG. 5, to determine the QoS to be accorded to the packet. For example, if the 4-bit code "0010" is retrieved from the address field of the packet, the lookup table indicates that the packet should be accorded a QoS level 2. Similarly, if the 4-bit code "0001" is retrieved from the address field of the packet, the lookup table indicates that the packet should be accorded a QoS level 1.

Module 402 then forwards the data packet and its QoS level designation to queue controller 403 that allocates the received data packet to be stored in one of queues 404a–e. For example, a data packet having a QoS level 2 is received by queue controller 403 and stored in queue 2 (404b), which is designated to store QoS level 2 data packets.

Packet scheduler 406 determines the order in which the queues 404a–e are to be serviced. Scheduler 406 communicates a particular queue service order to queue server 405 that forwards the packets stored in the queues over Data Out in a defined preferential order. Typically, data packets stored in the queue holding QoS level 1 packets (e.g., queue 1) are read out more frequently than data packets stored in queues having a lower QoS level. As packets are read out of the queues 404a–e they are output over Data Out to the next hop/link in the network cloud 303. In other words, packets stored in the queues are retrieved and forwarded over next hop links of the Internet by packet scheduler 405 in a preferential manner based upon the QoS assigned to the packets, with packets having a higher assigned QoS having transmission priority over packets having a lower assigned QoS.

FIG. 5 shows the contents of a lookup table 500 used by a router to determine the level of QoS service to be provided to information packets passing through the router 400. In the illustrative embodiment described herein a 4-bit QoS code of "0001" is assigned to QoS level 1, (i.e. the highest QoS level) and is used for Internet telephony traffic. Similarly, for the example used hereinabove, the QoS code of "0010" is assigned to QoS level 2, (the next highest QoS level), and is used for videoconferencing traffic. As shown in FIG. 1 a lower QoS level is assigned to entertainment traffic.

Figure 6:
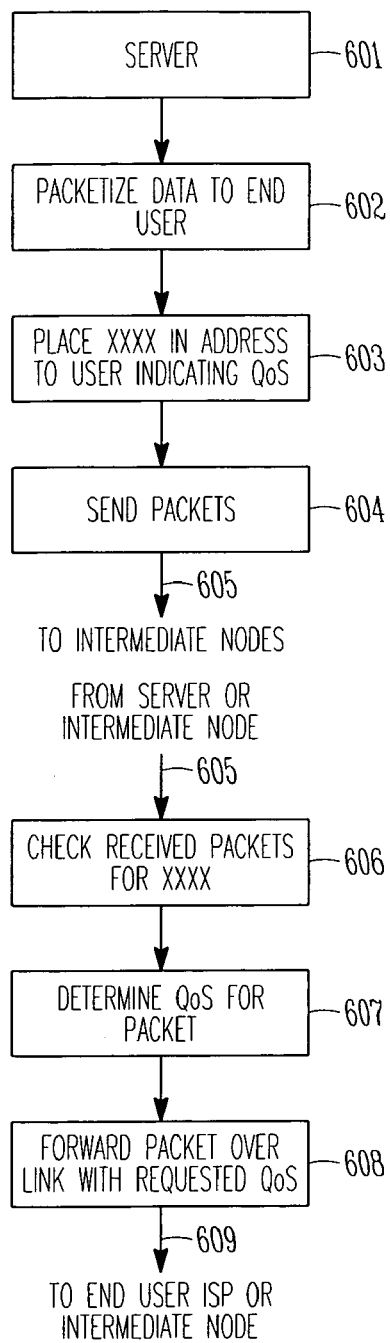
FIG. 6 shows the steps followed at servers, routers and hubs in generating and processing IPv6 addresses that carry QoS requests per the present invention.

FIG. 6 is a flow chart illustrating the steps followed at servers and routers when generating and processing IPv6 addresses to implement the present invention. The conventional routing flow ID module 402 is modified, preferably via software running on processors (not shown) in servers, routers and hubs, to access (read and write) the first four bits of the "D" portion of IPv6 addresses, and to look up stored QoS levels indicated by the four "IPv6 zoning" bits. In the following description an end user has requested information to be retrieved from a server 601. The user request is of low priority and flows between the user and server 601 in a manner well known in the art, so it is not described herein.

The following example only describes the flow of the high QoS packets, such as a movie from the entertainment zone or class of service, flowing from server 601 to the end user (client) who requested the movie. The following description often describes the steps followed for a single data packet, but the description applies to all data packets making up the movie.

Server 601 transmits the movie over the Internet in digitized form as a series of packets having a relatively high QoS. The high bandwidth required per the specified QoS is provided as described above with reference to FIG. 2. Server 601 retrieves the user requested movie from a memory device, such as a hard disk (not shown), and packetizes the movie for transmission in block 602. In the IPv6 address attached to each such packet is the Y.Z address portions that include the IP address of the user, as well as other information that is not described herein but which is well known in the art. At block 603 the server encodes the QoS information for a packet in the first four bits of the "D" portion of the address as previously described in detail. A movie may be classified as being in the entertainment zone and accordingly, the four QoS bits are configured as "1110" (as shown in FIG. 1). The complete IPv6 address generally appears as shown in FIG. 2.

Each packet with the configured IPv6 address is forwarded on a first hop 605 over the Internet to an intermediate node on the network at block 604. Typically, packets pass over the Internet backbone and through a number of intermediate nodes, such as routers and/or hubs (not shown), that forward the stream of packets to a next node on the network with the requested QoS. Eventually, each data packet arrives at a node of an ISP to which the user requesting the movie is attached.

In a router on the Internet backbone, a packet is received via link 605 at block 606 where the packet address information is processed in a manner well known in the art and, per the teaching of the invention, the first four bits "1110" of the "D" portion of the IPv6 address are decoded. That is, the router uses the "1110" bits to "look up" the specified QoS for the packet at block 607. At block 608 the packet is stored in and then forwarded from a high priority queue in the router, as previously described wth reference to FIG. 2. The packet is then forwarded to another intermediate node where the described process is repeated, or to the requesting user's ISP where the packet is processed in a manner well known in the art. The packet is then forwarded to the user that requested the movie. As mentioned above, this process is repeated for all packets that comprise the movie.

While what has been described herein is an embodiment of the invention, those skilled in the art will understand that numerous changes may be made without departing from the spirit and scope of the invention.

What is claimed is:

1. A method for providing Quality of Service (QoS) routing of a network packet, the method comprising inserting a QoS code into an Internet Protocol (IP) address of the network packet said QoS code becoming part of the IP address and uses four bits of the IP address to represented the QoS code.

2. The method in accordance with claim 1 further comprising:
   checking unused bits of the IP address to read the QoS code upon receiving the network packet at an intermediate node on a network; and
   re-transmitting the received network packet from the intermediate node with the QoS indicated by the QoS code.

3. The method in accordance with claim 2 further comprising storing the QoS code in the intermediate node.

4. The method in accordance with claim 1 wherein the IP address comprises an IP version 6 address.

5. A method for providing quality of service (QoS) routing of a network packet, the method comprising:
   associating one of a plurality of QoS codes with one of a plurality of QoS levels;
   inserting one of the QoS codes into an IPv6 address of the network packet, said QoS codes being represented as four bits and part of the IPv6 address;
   checking the IPv6 address to read the QoS code therein upon receiving the network packet at an intermediate node on a network; and
   forwarding the received network packet from the intermediate node with the QoS indicated by the QoS code.

6. The method in accordance with claim 5 further comprising the step of storing the QoS code in the intermediate node.

7. Apparatus for providing quality of service (QoS) routing of a network packet, the apparatus comprising:
   means for checking four bits of an Internet Protocol (IP) address associated with the network packet to read a QoS code therein upon receiving the network packet at an intermediate node on a network, said QoS code being part of the IP address; and
   means for forwarding the received network packet from the intermediate node with the QoS indicated by the QoS code.

8. The apparatus in accordance with claim 7 further comprising means for storing the QoS code in the intermediate node.

9. The apparatus in accordance with claim 8 wherein the IP address comprises an IP version 6 address.

10. The computer readable medium containing executable instructions for providing Quality of Service (QoS) routing of a network packet through a network, the executable program instructions comprising program instructions for inserting a four bit QoS code into an Internet Protocol (IP) address of the network packet, said QoS code becoming part of the IP address.

11. The computer readable medium in accordance with claim 10, wherein the executable program instructions further comprise program instructions for associating one of a plurality of QoS codes with one of a plurality of QoS levels.

12. The computer readable medium in accordance with claim 10, wherein the executable program instructions further comprise program instructions for:
   checking unused bits of the IP address to read the QoS code upon receiving the network packet at an intermediate node on a network; and
   forwarding the received network packet from the intermediate node with the QoS indicated by the QoS code.

13. The computer readable medium in accordance with claim 12, wherein the executable program instructions further comprises program instructions for storing the QoS code in the intermediate node.

14. The computer readable medium in accordance with claim 13, wherein the IP address comprises an IP version 6 address.

15. A computer readable medium containing executable instructions for providing Quality of Service (QoS) routing of a network packet through a network, the executable program instructions comprising program instructions for:
   checking an Internet Protocol (IP) address associated with the network packet to read a QoS code therein upon receiving the network packet at an intermediate node on a network, said QoS code being part of the IP address as four bits of information; and
   forwarding the received network packet from the intermediate node with the QoS indicated by the QoS code.

16. The computer readable medium in accordance with claim 15, wherein the executable program instructions further comprise program instructions for associating one of a plurality of QoS codes with one of a plurality of QoS levels.

17. A method for providing Quality of Service (QoS) routing of a network packet through intermediate nodes on a network, said method comprising the steps of:
   checking an Internet Protocol (IP) address associated with the network packet to read a QoS code therein upon receiving the network packet at an intermediate node on a network, said QoS code being part of the IP address four bits of the IP address;
   storing the network packets in queues based upon the QoS indicated by the QoS code;
   reading said network packets from said queues in a preferential manner; and
   forwarding the stored network packets read from the queues with the QoS indicated by the QoS code.

18. The method in accordance with claim 17 further comprising the steps of:
   associating one of a plurality of QoS codes with one of a plurality of QoS levels;
   storing the plurality of QoS codes in the intermediate node; and
   determining the QoS level that a network packet should be retransmitted with by using the QoS code read from the network packet during the step of checking unused bits to identify the associated QoS level.

19. The method in accordance with claim 18 wherein the IP address is an IP version 6 address.

* * * * *

UNITED STATES PATENT AND TRADEMARK OFFICE
CERTIFICATE OF CORRECTION

PATENT NO. : 7,136,382 B1  
APPLICATION NO. : 09/939447  
DATED : November 14, 2006  
INVENTOR(S) : Sharma et al.

Page 1 of 1

It is certified that error appears in the above-identified patent and that said Letters Patent is hereby corrected as shown below:

In column 8, line 65, in Claim 2, delete "re-transmitting" and insert -- forwarding --, therefor.

Signed and Sealed this

Twenty-third Day of January, 2007

JON W. DUDAS  
*Director of the United States Patent and Trademark Office*